(12) United States Patent
Lang

(10) Patent No.: US 11,879,417 B2
(45) Date of Patent: Jan. 23, 2024

(54) VAPOR CANISTER AND EVAPORATIVE EMISSIONS CONTROL SYSTEM FOR A VEHICLE

(71) Applicant: BORGWARNER AUTOMOTIVE SYSTEMS LUXEMBOURG SA, Bascharage (LU)

(72) Inventor: Daniel Lang, Bradley (LU)

(73) Assignee: BORGWARNER LUXEMBOURG OPERATIONS SARL, Hautcharage (LU)

( * ) Notice: Subject to any disclaimer, the term of this patent is extended or adjusted under 35 U.S.C. 154(b) by 0 days.

(21) Appl. No.: 17/774,643

(22) PCT Filed: Nov. 4, 2020

(86) PCT No.: PCT/EP2020/080990
§ 371 (c)(1),
(2) Date: May 5, 2022

(87) PCT Pub. No.: WO2021/089638
PCT Pub. Date: May 14, 2021

(65) Prior Publication Data
US 2022/0372934 A1 Nov. 24, 2022

(30) Foreign Application Priority Data
Nov. 5, 2019 (GB) ..................................... 1916085

(51) Int. Cl.
*F02M 25/08* (2006.01)

(52) U.S. Cl.
CPC .... *F02M 25/0836* (2013.01); *F02M 25/0818* (2013.01); *F02M 25/0854* (2013.01); *F02M 25/0872* (2013.01)

(58) Field of Classification Search
CPC ........... F02M 25/0836; F02M 25/0818; F02M 25/0854; F02M 25/0872; F02M 35/0218; B60K 15/03504; B60K 2015/03514
See application file for complete search history.

(56) References Cited

U.S. PATENT DOCUMENTS

| | | | | |
|---|---|---|---|---|
| 11,280,287 B1* | 3/2022 | Dudar | ..................... | F02D 29/02 |
| 2002/0162457 A1* | 11/2002 | Hyodo | ............... | F02M 25/0872 96/144 |

(Continued)

FOREIGN PATENT DOCUMENTS

| | | |
|---|---|---|
| EP | 0899450 A2 | 3/1999 |
| EP | 2906811 B1 | 2/2018 |

(Continued)

OTHER PUBLICATIONS

International Search Report for PCT/EP2020/080990 dated Dec. 17, 2020, 5 pages.

(Continued)

*Primary Examiner* — Xiao En Mo
(74) *Attorney, Agent, or Firm* — Warner Norcross + Judd LLP

(57) ABSTRACT

A vapor canister for a vehicle evaporative emissions control system comprises a canister housing defining an internal volume for receiving therein one or more volumes of adsorbent; a fuel vapor inlet port for connecting the canister to a fuel tank; a vent port for intake of fresh air into the canister; a purge port for withdrawing fuel vapors from the canister; and a pump integrated with the canister housing. The integrated pump is actuated to provide an overpressure or underpressure in the canister. The integrated pump can be used for various operating modes, such as e.g. canister purging, leak detection diagnostic, refueling or engine shut down.

12 Claims, 2 Drawing Sheets

(56) References Cited

U.S. PATENT DOCUMENTS

| | | |
|---|---|---|
| 2005/0011185 A1 | 1/2005 | Annoura et al. |
| 2005/0139197 A1 | 6/2005 | Ohhashi |
| 2007/0012298 A1 | 1/2007 | Nakamura et al. |
| 2013/0096774 A1* | 4/2013 | Takata ................... B60K 15/00 701/36 |
| 2016/0084175 A1* | 3/2016 | Dudar ................ F02M 25/0818 123/519 |
| 2016/0245238 A1* | 8/2016 | Ueda ................. F02M 25/0854 |
| 2017/0198671 A1* | 7/2017 | Dudar .................. F02M 35/104 |
| 2018/0195468 A1 | 7/2018 | Mani et al. |
| 2019/0293031 A1 | 9/2019 | Dudar |
| 2019/0301403 A1 | 10/2019 | Asanuma |
| 2020/0018247 A1* | 1/2020 | Shinagawa ........... F02D 41/003 |
| 2020/0166009 A1* | 5/2020 | Takahashi .......... F02M 25/0872 |
| 2020/0378345 A1* | 12/2020 | Dudar .................. F02M 25/089 |
| 2022/0090565 A1* | 3/2022 | Diamond ............. F02M 25/089 |
| 2022/0185101 A1* | 6/2022 | Ko ................... B60K 15/03504 |

FOREIGN PATENT DOCUMENTS

| | | |
|---|---|---|
| EP | 3382190 A1 | 10/2018 |
| JP | 2005054704 A | 3/2005 |
| WO | 2020262216 A1 | 12/2020 |

OTHER PUBLICATIONS

Machine assisted English translation of JP2005054704A obtained from https://patents.google.com/patent on May 5, 2022, 6 pages.
Machine assisted English translation of WO2020262216A1 obtained from https://patents.google.com/patent on May 5, 2022, 7 pages.

* cited by examiner

VAPOR CANISTER AND EVAPORATIVE EMISSIONS CONTROL SYSTEM FOR A VEHICLE

CROSS-REFERENCE TO RELATED APPLICATIONS

This application is the National Stage of International Application No. PCT/EP2020/052663, filed on 4 Nov. 2020, which claims priority to and all advantages of United Kingdom Patent Application No. 1916085.2, filed on 5 Nov. 2019, the contents of which are hereby incorporated by reference.

FIELD OF THE INVENTION

The present invention generally relates to the field of fuel emission control in internal combustion engines. More specifically, the invention concerns an evaporative canister for use in an evaporative emissions control canister system for an internal combustion engine, to reduce emissions from fuel systems.

BACKGROUND OF THE INVENTION

Evaporation of gasoline fuel from motor vehicle fuel systems is a major potential source of hydrocarbon air pollution. Such emissions can be controlled by canister systems that employ activated carbon to adsorb the fuel vapor emitted from the fuel systems. As it is known, when a vehicle is parked in a warm environment during the daytime heating (i.e., diurnal heating), the temperature in the fuel tank increases resulting in an increased vapor pressure in the fuel tank. A mixture of fuel vapor and air from the fuel tank enters the canister through a fuel vapor inlet of the canister and diffuses into the adsorbent volume where the fuel vapor is adsorbed in temporary storage and the purified air is released to the atmosphere through a vent port of the canister. Under certain modes of engine operation, the adsorbed fuel vapor is periodically removed from the activated carbon by purging the canister systems with ambient air to desorb the fuel vapor from the activated carbon. The regenerated carbon is then ready to adsorb additional fuel vapor.

A conventional type of canister is, e.g., disclosed in EP0899450 or EP2906811.

The purge air does not desorb the entire fuel vapor adsorbed on the adsorbent volume, resulting in a residue hydrocarbon, known as "heel", that may be emitted to the atmosphere. In addition, that heel in local equilibrium with the gas phase also permits fuel vapors from the fuel tank to migrate through the canister system as emissions. Such emissions typically occur when a vehicle has been parked and subjected to diurnal temperature changes over a period of several days, commonly called "diurnal breathing losses", DBL.

DBL is a major concern for automotive manufacturers, also because of regulations taken by some countries or states.

In this connection, canister emissions can be reduced by optimizing canister geometry, selecting appropriate carbons (combination of high capacity carbons adsorbents and low bleed adsorbents), and ensuring good purging of the canister. Unfortunately, with modern engines it may be difficult to draw sufficient amounts of air through the canister to pull the purge vapor into the engine. Typically, turbo-charged engines inherently reduce points where manifold vacuum is available limiting purge events to a small region of engine operation. Furthermore, hybrid powertrains add further limitation for purge events due to reduced uptime of the internal combustion engine.

In addition to reducing DBL, new evaporative emissions systems for US LEV III and CN6 as well as future EU legislation require detection of:
- a physically damaged evaporative emissions system, e.g. cracked housing, etc.;
- a disconnected hose which could release captured gases to the atmosphere;
- a damaged or disconnected wiring inhibiting functionality.

In order to improve the transfer of purge vapor to the engine, it has been proposed to add a purge pump in the purge line connecting the canister to the air induction system of the engine.

Furthermore, the above-mentioned diagnostic requires the installation of sensors in the evaporative emissions system, e.g. temperature and/or pressure sensors.

Altogether, the complexity of the evaporative emissions system is increased, due to the additional number of components.

OBJECT OF THE INVENTION

The object of the present invention is to improve the design of evaporative emissions control systems.

SUMMARY OF THE INVENTION

According to the present invention, a vapor canister, in particular for a vehicle evaporative emissions control system, comprises: a canister housing defining an internal volume for receiving therein one or more volumes of adsorbent; a fuel vapor inlet port for connecting the canister to a fuel tank; a vent port for intake of fresh air into the canister; and a purge port for withdrawing fuel vapors from the canister. Remarkably, a pump is integrated with the canister housing.

The present invention thus proposes a vapor canister that already integrates a pump that can be selectively operated, in particular by the ECU, in order e.g. to assist during purging events to push/pull purge vapors from the canister to the engine.

The immediate advantages of combining the pump and the canister into one device are: reducing complexity (system integration, hoses, wire harness, controller, assembly steps etc.); reducing required space and increasing packaging flexibly; reducing weight; and reducing costs.

Advantageously, the pump is configured to be reversible, i.e. it has the capacity to create an overpressure or an underpressure during a certain time period, as may be useful for certain functionalities. In particular, the pump may be integrated in the canister to create an overpressure adapted for predetermined operating modes, in particular for a purge mode or leakage detection diagnostic. The purge pump may further be integrated in the canister to create an underpressure adapted for predetermined operating modes, in particular for a leakage diagnostic mode, refueling mode or engine shut down mode.

As used herein, the terms overpressure and underpressure are used to designate a pressure differential with respect to an initial or reference pressure, e.g. atmospheric pressure. Overpressure, or also positive pressure, thus conventionally designates a pressure larger than the reference/atmospheric pressure. Conversely, underpressure, or negative pressure, conventionally designates a pressure inferior to the reference/atmospheric pressure.

In general, the pump is configured to be able to move flows of air and/or fuel vapors in the system. The pump may comprise a pumping member, e.g. pumping wheel or turbine, that is operatively coupled to a drive motor, in particular an electric motor. Advantageously, the housing of the pump is provided in part by the canister housing and in part by a dedicated pump housing part. The pumping member is the main part of the pump. The design of the pumping member depends on the pump type. Any kind of pumping technology appropriate for moving/compressing gases can be used. In particular, the pump may e.g. be a centrifugal pump (with e.g. a rotary impeller with blades) or a rotary positive displacement pump (e.g. with rotary gear, lobe or vane pump).

In embodiments, the drive motor is arranged in a first housing part, whereas second housing part is provided by the vapor canister housing that is designed to receive and accommodate the pumping member of the pump. The canister housing may thus comprise an aperture or cavity in an outer wall that receives the pumping member, whereas the first housing part protrudes outside of the canister housing and is mounted thereto in a sealed manner.

In other words, the canister housing is configured to form a complementary housing part accommodating the pumping element. The complementary housing part extends inside the canister. It forms a housing for the pump element and is also configured as functional component of the pump, cooperating with the pumping element. For example, the complementary housing part may have an internal shape configured to cooperate with the pumping member to achieve the desired pumping effect.

The complementary housing part is preferably operatively connected to one or more of the ports. The complementary housing part may advantageously include inlet and outlet orifices (the function of the orifices may be inverted depending on whether the pump is operated to create a positive or negative pressure). The inlet orifice communicates with one or more of the ports by appropriate duct means. The outlet orifice of the complementary housing part may also be in fluid communication through duct means with one of the ports or with a given region of the canister.

In embodiments, motor housing is a cup-shaped shell in which the drive motor is arranged and comprises at its open end, a peripheral flange by which it is fixed to the outer wall of the canister housing in a sealed manner.

In embodiments, the canister housing includes an internal passage extending from one of the ports, in particular the fuel vapor inlet port, into the canister and opening into one of the volumes of adsorbent; and the pump is operatively coupled with the internal passage to move air and/or vapor therethrough.

The pump is integrated in the canister to create an overpressure adapted for predetermined operating modes, in particular for a purge mode or leak detection mode In general, the canister internal volume may comprise one or more volumes of fuel vapor adsorbent material for temporarily adsorbing and storing fuel vapor entering via the fuel vapor inlet port. The internal volume may e.g. include an initial adsorbent volume and a subsequent adsorbent volume. The skilled person will select the appropriate adsorbent materials depending on the desired performance of the vapor canister in terms of fuel emissions. Conventional adsorbent materials for vapor canisters typically comprise activated carbon which may have a variety of shapes, in particular granules or pellets, of variable adsorption capacity, as is known in the art.

In some embodiments, high capacity adsorbents are preferred for the initial adsorbent volume, whereas so-called low bleed adsorbents are used as subsequent adsorbent volume. In this connection, low bleed adsorbents may be available in granular form or as monoliths (also referred to as monoliths).

The vapor canister may further include one or more additional adsorbent volumes that are placed in separate housings downstream of the vent port, e.g. with low bleed monolith(s).

It may be noted that although the present vapor canister has been developed in the context of automotive vehicles, its design principle can be adapted for a variety of applications using internal combustion engines, be it for vehicles, stationary applications, or apparatuses in various fields.

According to another aspect, the present invention concerns an evaporative emissions control system for a vehicle comprising:
  a fuel tank for storing a volatile fuel;
  a vapor canister according to any one of the preceding claims;
  a vapor line for conducting fuel vapor from the tank to the canister vapor inlet port, a tank valve being arranged in said vapor line;
  a purge line from the canister purge port to an induction system of an internal combustion engine, a purge valve being arranged in said purge line;
  a vent line connected to the vent port, a vent valve being arranged in said vent line.

In the following, different methods of using the present evaporative emissions control system are disclosed, in order to perform a variety of functions.

According to an aspect, a method of purging a canister of the present evaporative emissions control system comprises: operating the pump to create an overpressure in the canister while the vent valve and purge valve are open and the tank valve is closed, in order to assist in moving fuel vapors from the canister to the engine to be consumed therein during combustion.

According to another aspect, a method of detecting leakage in the present evaporative emissions control system comprises:
  a) operating the pump during a predetermined amount of time to create an overpressure or underpressure in the system;
  b) monitoring a parameter indicative of fuel vapor pressure in the system during a predetermined monitoring time period;
  c) concluding to the existence of a leakage in case the parameter changes over time.

According to still another aspect, a method of operating the present evaporative emissions control system is disclosed, wherein during a refueling event of the tank, the pump is operated to create an underpressure in the system to limit vapor emissions through a fill opening of the fuel tank; and wherein, preferably, while the pump is operated the vent valve and purge valve are closed and the tank valve is open.

According to yet another aspect, a method of operating the present evaporative emissions control system is disclosed, wherein at engine shut down, the pump is operated to create an underpressure in the system to draw therein gases from the engine's induction system, and wherein, preferably, the purge valve is open whereas the vent and tank valves are closed.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
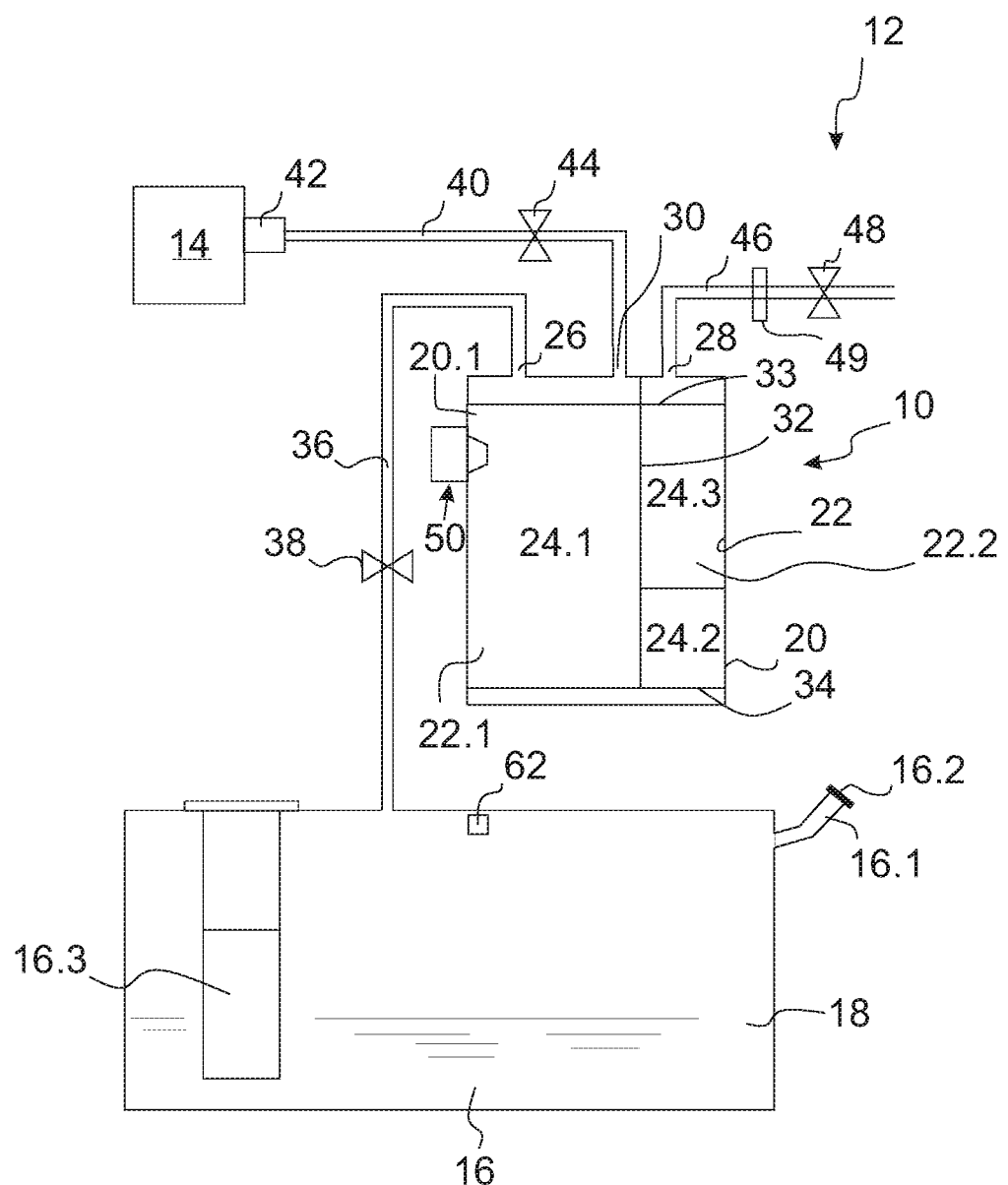
FIG. 1: is a principle diagram of an evaporative emissions control system using an embodiment of the present vapor canister.

FIG. 1 illustrates one embodiment of the present vapor canister 10 as used in an evaporative emission control canister system 12 of an internal combustion engine designated 14.

The evaporative emission control canister system 12 comprises a fuel tank 16 and the vapor canister 10 for the temporary storage of hydrocarbons. The fuel tank 16 conventionally includes a refueling duct 16.1 closed by a removable cap 16.2, as well as a fuel pump and gauge unit 16.3 adapted to forward fuel 18 (gasoline or other fuel for automotive vehicles) from the fuel tank 16 to the fuel injection system (not shown) of the engine 14.

The fuel tank 16 and the vapor canister 10 are connected to one another such that hydrocarbons outgassed from the fuel 18 situated in the fuel tank 16 can be stored in the vapor canister 10. The vapor canister 10 contains one or more volumes of adsorbing material(s), in which fuel vapors (hydrocarbons) accumulate. The vapor canister 10 however has a limited storage capacity, and therefore must be regularly evacuated by virtue of fresh air being drawn in.

The internal structure of the vapor canister 10 is shown in FIG. 1. The vapor canister 10 includes a canister housing 20 defining an internal volume 22 in which one or more volumes of adsorbent 24 is/are arranged. The adsorbent material may typically include activated carbon in any appropriate form. Here the canister contains three volumes of adsorbent designated 24.1, 24.2 and 24.3.

The canister 10 is configured to define a flow path for air and fuel vapors through the adsorbent volumes 24, in-between a fuel vapor inlet port 26 and a vent port 28. Reference sign 30 designates a purge outlet.

The canister housing 20 comprises a partition wall 32 dividing the canister into two chambers 22.1 and 22.2, thereby defining a U-shaped flow path through the canister. The canister 10 typically contains an initial adsorbent volume, located on the fuel source side, i.e. close to the fuel port 18, and a subsequent adsorbent volume designed e.g. as low bleed adsorbent volume. Here canister includes an initial adsorbent volume 24.1 in the first chamber 22.1, while the second chamber 22.2 comprises a second adsorbent volume 24.2 at its bottom (same of different adsorbent material as for 24.1). A low bleed adsorbent volume 24.3 is located at the top of the second chamber 22.2, before the vent port 28. Conventionally, the adsorbent material is held by means of a front screen 33 and support screen 34. The bottom of the canister, below support screen 34, forms an air gap in communication with both chambers 22.1 and 22.2, through which air and fuel vapors can exchange; chambers 22.1 and 22.2 are thus connected in series. The above is only an example of the adsorbent materials configuration that can be used and should not be construed as limiting. Those skilled in the art will adapt the adsorbent volumes and types and retaining methods and configurations according to the desired application. Since it is not the focus of the invention, this will not be discussed in detail.

As it will be understood, the arrangement of an initial adsorbent volume on the fuel source side and of one or more subsequent low bleed adsorbent volumes implies predetermined flow paths:

a fuel vapor flow path from the fuel port 26 to the initial adsorbent volume 24.1, 24.2, toward the subsequent, low bleed adsorbent volume 24.3, and the vent port 28; and an air flow path from the vent port 28 (or vent conduit) to the subsequent, low bleed adsorbent volume 24.3 toward the initial adsorbent volumes 24.1 and 24.2 and the purge port 26.

In the evaporative emission control canister system 12 the canister fuel port 26 is connected to the fuel tank 16 via a fuel vapor inlet conduit 36. A first valve 38 is arranged to open or close the flow through conduit 36. A fuel vapor purge conduit 40 connects the purge port 30 of the canister 10 to the air induction system 42 of the internal combustion engine 14. Here a second valve 44 is arranged to open or close flow through the purge conduit 40. A vent conduit 46 preferably connected at one end to the canister vent port 28 and open at the other end to the atmosphere, for venting the canister 10 and for admission of purge air, or both. A third valve 48 is arranged on the vent conduit 46 to open or close the flow therethrough. Preferably, a check valve 49 is arranged in the vent conduit 46 to only allow flow towards the vapor canister 10.

When the engine is off, the fuel vapor from the fuel tank 16 enters the canister 12 through the fuel vapor inlet 26. The fuel vapor diffuses into the initial adsorbent volumes 24.1, 24.2, and then into the subsequent adsorbent volume 24.3. When the engine is turned on, ambient air can be drawn into the canister system 10 through the vent port 28. The purge air flows through the subsequent adsorbent volume 24.3 and then the initial adsorbent volume 24.1, 24.2, and desorbs the fuel vapor adsorbed on the adsorbent volumes before entering the purge duct 40 via purge port 30. The vapor laden purge air is thus forwarded via purge duct 40 to the induction system 42 of the engine, to be combusted therein.

It will be appreciated that the present vapor canister 10 comprises a pump 50 integrated with the canister housing 20. The pump 50 is mounted to an outer wall 20.1 of the canister housing 20 to be in communication with the internal volume 22 of the canister in order to create an overpressure (positive pressure) or an underpressure (negative pressure) in the canister and/or in the system.

Figure 2:
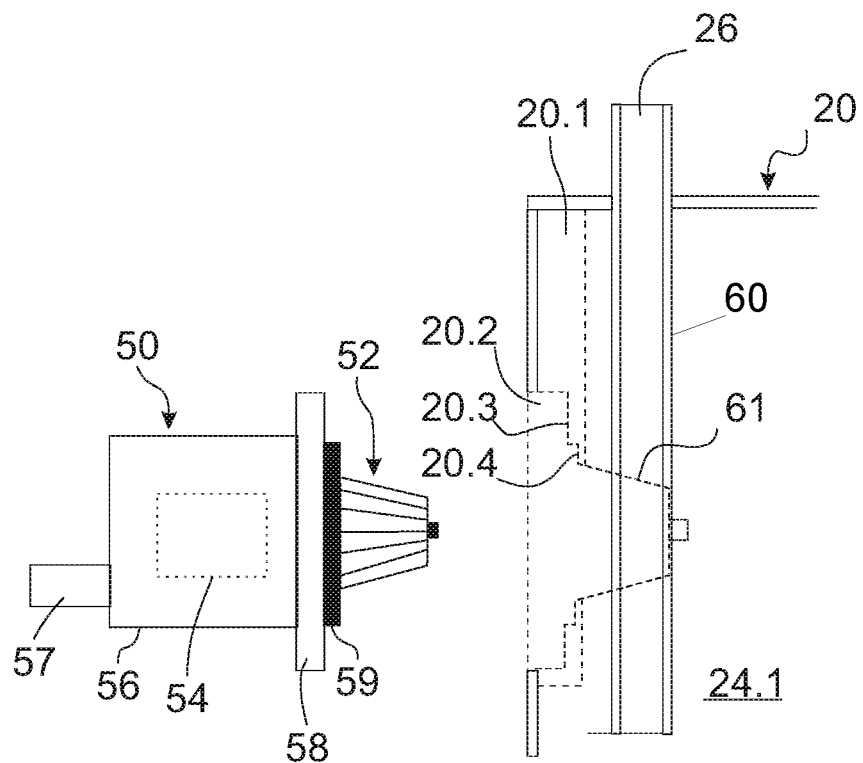
FIG. 2: is a detail sketch illustrating the integration of the pump of the vapor canister from FIG. 1.

The mounting of the pump 50 to the canister wall 20.1 is achieved through an aperture 20.2 in the outer wall 20.1, as best understood from FIG. 2. The pump 50, here e.g. of the centrifugal type, comprises a pump wheel 52 (or impeller/turbine) forming the pumping member that is operatively coupled to an electric motor 54 shown in dashed lines. The pumping member 52 can be directly mounted on the motor's output shaft or is coupled thereto by means of a gear reductor. The electric motor 54 can be of any appropriate type, e.g. brushed or brushless.

The electric motor 54 is arranged inside a cup-shaped housing shell 56 with a radially extending peripheral flange 58 opposite the closed bottom. The motor housing 56 accommodates the motor 54 and optionally control electronics, and extends to the base of the pump wheel 52. The flange 58 is thus at the transition between the motor 54 and pump wheel 52. Reference sign 57 designates electrical connectors protruding at the rear of the motor housing 56. An annular seal 59 is positioned against the flange 58 to surround the base of the pumping member 52.

The pump 50 is assembled to the canister housing 20 by introducing the pump wheel 52 through aperture 20.2. The canister housing is configured to form a complementary housing part 61 for the pump wheel. This complementary housing part 61 is shown in dashed lines in FIG. 2, since in the present embodiment the complementary housing part 61 is not in the cut plane of FIG. 2, but behind it.

The region of the canister housing receiving the pump 50 comprises a thickened wall portion 20.1, arranged under the fuel port 26, offset from the cylindrical passage (pipe) 60 extending in the canister 10 from the fuel port 26 and opening further below in the adsorbent volume.

The aperture 20.2 is provided in this portion 20.1 and comprises a stepped inlet section defining an inner 20.3 and an outer 20.4 radially extending annular surface, and opens into the internal cavity defined by the complementary housing part 61. The inner and outer surfaces 20.3, 20.4, are configured to mate with flange 58 and seal 59.

As will be understood, when the pump 50 is introduced through aperture 20.2, the annular flange 58 comes into abutment with annular surface 20.3, the seal 59 is in abutment with annular surface 20.4 and the pumping member 52 fits into complementary housing part 61. Flange 58 typically serves for fixing the pump 50 to the casing 20, thereby creating one assembly. Any appropriate fixing means can be used for fixing the pump 50 to the canister housing 20, e.g. fasteners, glue, welding, clipping, heat staking, etc.

The complementary housing part 61 forms a housing for the pump wheel 52 and is preferably also configured as functional component of the pump cooperating with the pump wheel. For example, the complementary housing part 61 has an internal shape that matches the shape of the pump wheel 52 and is preferably configured to provide the desired pumping effect. In other words, the configuration of the internal surface of the complementary housing part 61 may be designed to cooperate with the pump wheel, as functional element of the pump.

Furthermore, although not disclosed, the complementary housing part 61 includes inlet and outlet orifices (not shown), at least the inlet orifice being in fluid communication with the fuel port 26. For example, inlet orifice of the complementary housing part 61 may be in fluid communication with passage 60 through appropriate duct means (not shown). The outlet of the complementary housing communicates with duct means opening further downstream of port 26 in passage 60, or directly into the canister volume.

The present vapor canister 10 thus includes an integrated pump 50, forming one package, thereby lowering complexity and costs, and improving integration flexibility for the end customer.

The pump 50 can be based on any appropriate technology, suitable for pumping gases such as air and fuel vapors.

As will now be described, such a pump 50 can be used to create an overpressure or underpressure that can be used for different functions or operating modes. The pump 50 may be typically be controlled by the Engine control unit (ECU), that will selectively activate/energize the pump for the desired functions.

i) Purge Event

The pump 50 can be activated to create an overpressure that will be of assistance during a purge event, in order to increase the amount of fuel vapor that is pulled from the vapor canister 10 and forwarded to the engine air induction system 42. Typically, the ECU may command the pump to activate during engine events where sufficient manifold vacuum is not available in order to assist in pulling vapors from the canister. During such purge event, valves 44 and 48 are open, whereas valve 38 is closed.

ii) Leakage Detection

On-Board leakage detection can be performed with the assistance of the pump. The pump is activated for a predetermined amount of time (depending on system volume) to create a negative or positive pressure. The pressure in the system may then be monitored by means any appropriate means, electrical feedback from sensors and the liked included in the canister assembly. Such sensor(s) allow detecting a pressure decay in the system, which indicates a leakage. This of course requires the system to be sealed off, i.e. all valves closed.

Reference sign 62 in FIG. 1 indicates a pressure sensor.

Pressure monitoring may involve measuring the pressure in the system at the moment the pump is shut down after the activation period; this is the reference pressure. The pressure is then measured at one or more predetermined periods after the end of pump activation, e.g. after a few minutes up to 10, 15 or 30 min.

In summary, leakage in the evaporative emissions control system can be detected by a leakage detection routine comprising the following steps:
  a) operating the pump during a predetermined amount of time to create an overpressure or underpressure in the system;
  b) monitoring a parameter indicative of fuel vapor pressure in the system during a predetermined monitoring time period;
  c) concluding to the existence of a leakage in case the parameter changes over time.

iii) Tank Refueling

The position of the fuel pump 50, close to the fuel inlet port 26 and tank line 36, allows creating a negative pressure in the fuel tank to capture airborne emissions during fueling events.

In order words, during a refueling event, the pump 50 is operated to created an underpressure that will permit capturing fuel vapors due to the filling operation. For this, the vent valve and purge valve are closed and the tank valve is open.

iv) Engine Shut Down

The position of the fuel pump 50 in the canister 10 further allows being used to evacuate unburned hydrocarbons from the engine air inducting system 42.

Accordingly, the pump 50 can advantageously be activated to create a negative pressure during a predetermined time period after engine shut down in order to draw into the canister 10 airborne emissions from the air induction system 42. This further eliminates the need for additional carbon filter or hydrocarbon absorber in the engine air box.

During this operation mode, the purge valve is open whereas the vent and tank valves are closed.

The invention claimed is:

1. A vapor canister for an evaporative emissions control system, comprising:
  a canister housing defining an internal volume for receiving therein one or more volumes of adsorbent;
  a fuel vapor inlet port for connecting the canister to a fuel tank;
  a vent port for intake of fresh air into the canister;
  a purge port for withdrawing fuel vapors from the canister;
  a pump integrated with the canister housing, said pump comprising a pumping member operatively coupled to a drive motor, the pump being integrated to an outer wall of the canister housing such that the pumping member is in communication with the internal canister volume to create an overpressure or an underpressure;

the pump comprising a motor housing that holds the drive motor;

the canister housing comprising an aperture in said outer wall through which the pumping member is received in the canister housing;

wherein the motor housing is mounted to the canister housing in a sealed manner, the motor housing protruding from the outer wall outside said canister; and wherein the canister housing is configured to form a complementary housing part, extending inside said canister housing, and accommodating the pumping member therein, the complementary housing part having an internal shape configured to cooperate with the pumping member to achieve a desired pumping effect.

2. The vapor canister according to claim 1, wherein the motor housing is a cup-shaped shell in which the drive motor is arranged and comprises at its open end, a peripheral flange by which it is fixed to the outer wall of the canister housing in a sealed manner, the cup-shaped shell protruding from the outer wall outside said canister.

3. The vapor canister according to claim 1, wherein the canister housing includes an internal passage extending from one of the ports into the canister and opening into one of the volumes of adsorbent; and the pump is operatively coupled with the internal passage to move air and/or vapor therethrough.

4. The vapor canister according to claim 1, wherein the complementary housing part is operatively connected to one or more of said ports.

5. The vapor canister according to claim 1, wherein the pump is integrated in the canister to create an underpressure adapted for predetermined operating modes.

6. The vapor canister according to claim 1, wherein the canister contains in said internal volume one or more volumes of fuel vapor adsorbent material for temporarily adsorbing and storing fuel vapor entering via the fuel vapor inlet port.

7. An evaporative emissions control system for a vehicle comprising:

a fuel tank for storing a volatile fuel;

a vapor canister according to claim 1;

a vapor line for conducting fuel vapor from the tank to the canister vapor inlet port, a tank valve being arranged in said vapor line;

a purge line from the canister purge port to an induction system of an internal combustion engine, a purge valve being arranged in said purge line; and a vent line connected to the vent port, a vent valve being arranged in said vent line.

8. A method of purging a vapor canister of an evaporative emissions control system, the vapor canister being the vapor canister of claim 1, said method comprising: operating the pump to create an overpressure in the vapor canister while the vent valve and purge valve are open and the tank valve is closed, in order to assist in moving fuel vapors from the vapor canister to the engine to be consumed therein during combustion.

9. A method of detecting leakage in an evaporative emissions control system according to claim 7, comprising:

a) operating the pump during a predetermined amount of time to create an overpressure or underpressure in the system;

b) monitoring a parameter indicative of fuel vapor pressure in the system during a predetermined monitoring time period; and c) concluding to the existence of a leakage in case the parameter changes over time.

10. A method of operating an evaporative emissions control system according to claim 7, wherein during a refueling event of the tank, the pump is operated to create an underpressure in the system to limit vapor emissions through a fill opening of the fuel tank.

11. A method of operating an evaporative emissions control system according to claim 7, wherein at engine shut down, the pump is operated to create an underpressure in the system to draw therein gases from the engine's induction system, and wherein, preferably, the purge valve is open whereas the vent and tank valves are closed.

12. The vapor canister according to claim 1, wherein the pump is integrated in the canister to create an overpressure adapted for predetermined operating modes, in particular for a purge mode or leak detection diagnostic.

* * * * *